Patented Oct. 20, 1931

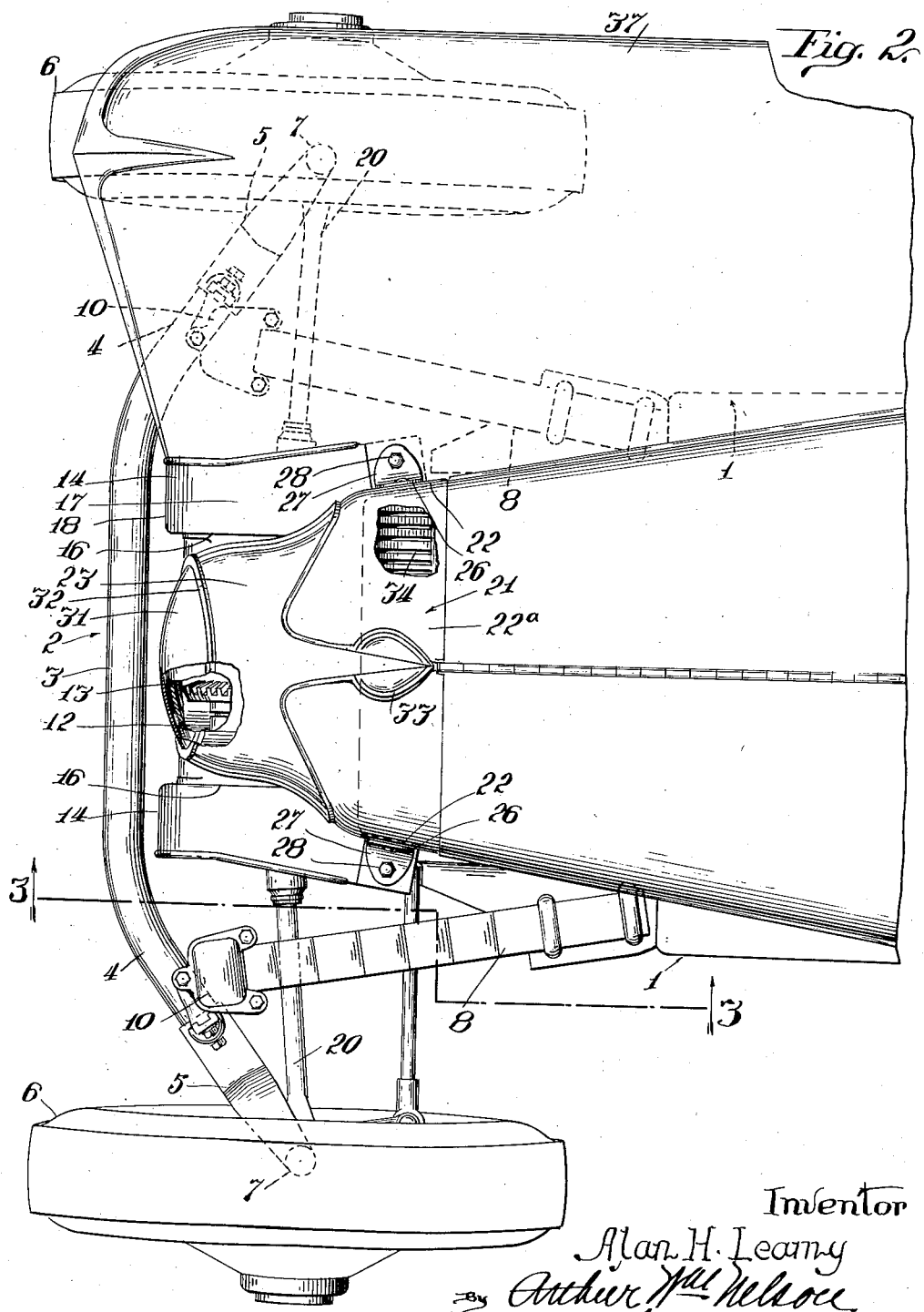

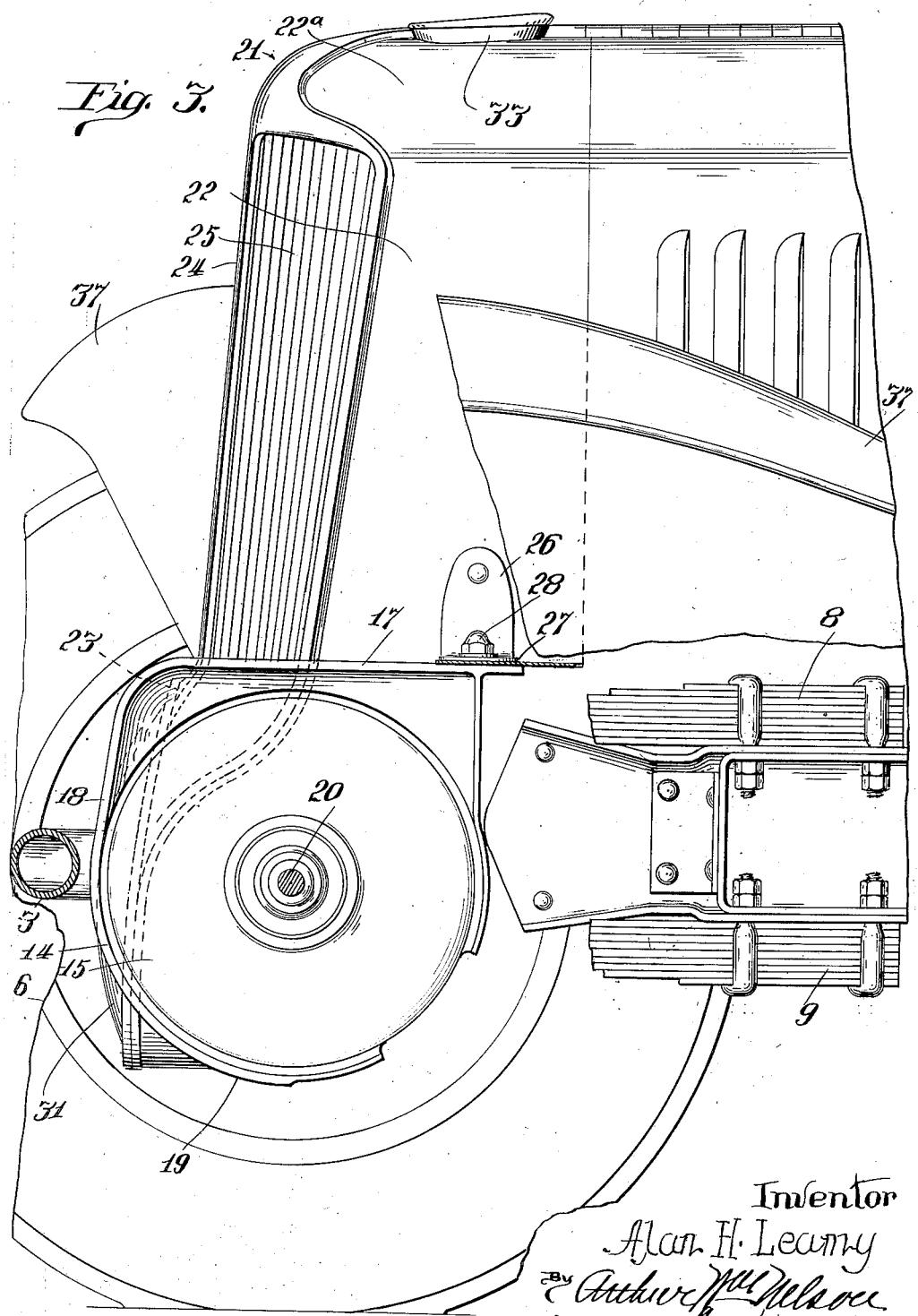

1,828,327

UNITED STATES PATENT OFFICE

ALAN H. LEAMY, OF AUBURN, INDIANA, ASSIGNOR TO MANNING & CO., OF CHICAGO, ILLINOIS, A CORPORATION OF ILLINOIS

FRONT DRIVE AUTOMOBILE

Application filed January 18, 1930. Serial No. 421,638.

This invention relates to improvements in front drive automobiles and it consists of the matters hereinafter described and more particularly pointed out in the appended claims.

The automobile with which the present invention is particularly concerned includes a differential gear case disposed at the front end thereof, below the radiator and its shell and the main object of the invention is to so form the shell that it conceals the greater portion of said gear case which would otherwise make it objectionable as to appearance.

Another object of the invention is to so construct the shell as to provide an apron at the bottom end thereof which covers a part of the differential gear case and has a four point supporting bearing on the brake drum covers, one disposed at each side of the differential.

Another object of the invention is to provide a structure which imparts height to the shell so that the several portions thereof may be coordinated to produce a neat and pleasing appearance to the front end of the automobile.

These objects of the invention as well as others together with the many advantages thereof will more fully appear as I proceed with my specification.

In the drawings:—

Fig. 2 is a top plan view of the same with parts broken away to more fully disclose the construction of the automobile.

Fig. 3 is a longitudinal vertical sectional view on an enlarged scale as taken on the line 3—3 of Fig. 2.

Figure 1:
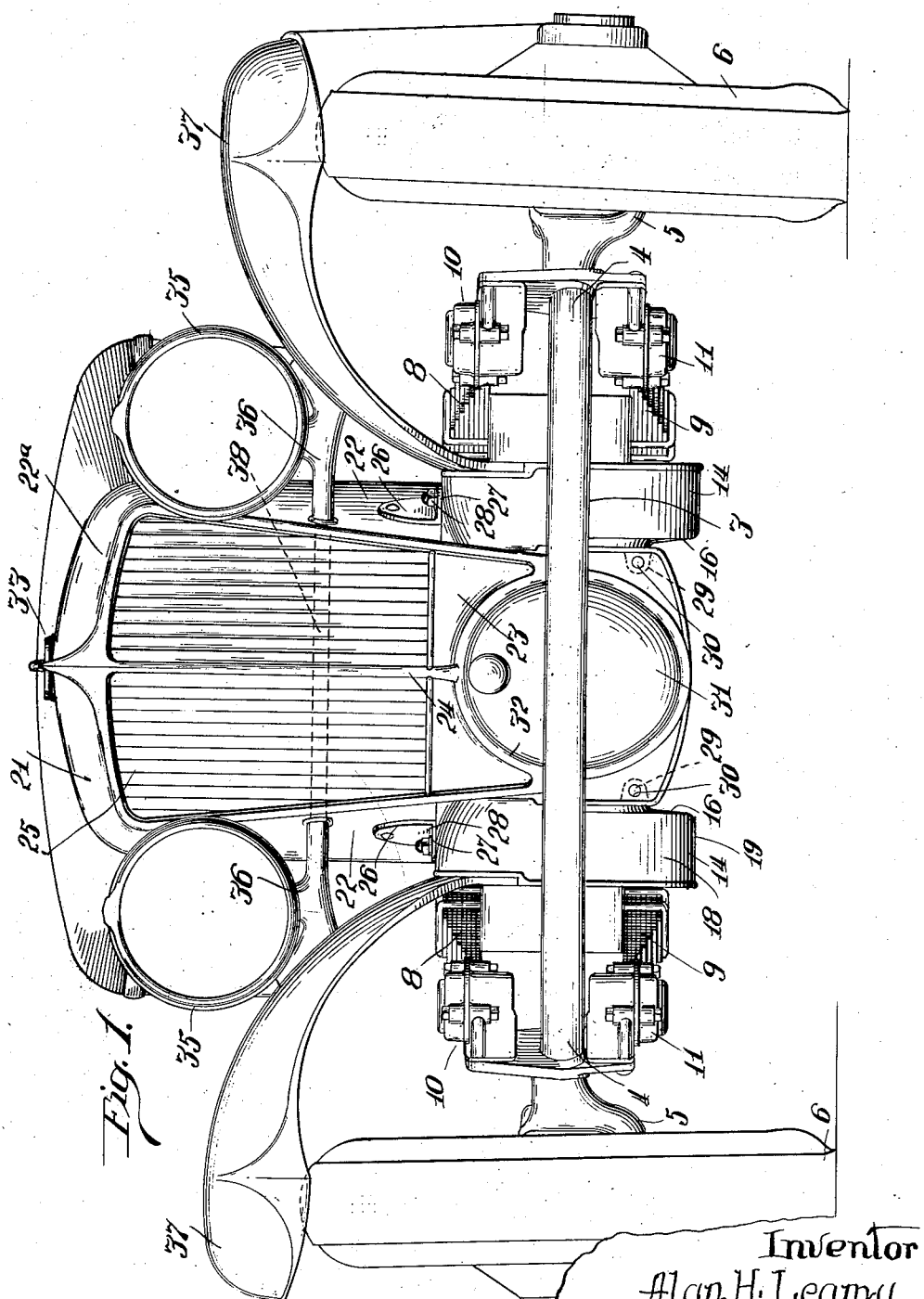
Fig. 1 is a view in front end elevation of a front drive automobile embodying my invention.

In general the automobile embodying my invention includes a dead front axle having a transversely extending mid portion and rearwardly deflected end portions each including a yoke to which an associated driven front wheel is operatively connected for a steering movement. On the median line of the automobile as a whole, in substantially the plane of and just to the rear of the front axle is located the differential gear casing, supported as a part of a unit with the engine and transmission casing respectively. At each side of the differential casing is a housing for the braking mechanism for the associated driven shafts of the differential and each of said shafts is operatively connected by a power transmitting shaft and universal joints with an associated front wheel.

A radiator and shell is located above the differential and is supported in place upon the housings of the brake mechanism, the shell including an apron at its bottom end arranged to cover the front portion of the differential casing. In this manner said casing is concealed from view and the shell is provided with that height necessary to give it graceful and pleasing lines which enhances its appearance.

Referring now in detail to that embodiment of the invention illustrated in the accompanying drawings, 1—1 indicate the front end extension members of associated side frame members of the automobile and 2 indicates as a whole the front axle of the automobile. Said axle which is located a suitable distance in advance of the frame member extensions 1—1, includes a central portion 3 extending transversely with respect to the said frame extensions, and rearwardly deflected end portions 4—4. On the extremity of each end portion is a yoke 5 to which an associated front wheel 6 is operatively connected for a steering movement about spindle axes 7—7 as best shown in Fig. 2.

Fixed to each frame extension 1 and projecting in a forwardly and outwardly direction therefrom is a pair of top and bottom springs 8 and 9 respectively. Said springs each comprises a stack of leaves and the front end of the main leaf of each stack is operatively engaged in top and bottom rubber shock insulated housings 10 and 11 respectively, on each rearwardly deflected end portion 4 of the axle 2.

12 indicates as a whole the differential gear casing of the automobile disposed on the vertical median line of the automobile a short distance to the rear of the axle portion 3. Said casing is mounted as a unit with the transmission gear case and engine respectively in the order named but not shown herein. In said casing is located the differential gearing 13 as best shown in Fig. 2. At each side of and fixed to said casing is a brake drum housing 14 for the brake drums 15 one on each driven shaft of the differential. Each brake drum housing includes a vertically disposed wall 16 fixed directly to the gear casing 12, a substantially flat, top horizontal flange 17 and a front flange 18 that terminates in a curved bottom flange portion 19. Associated with each drum 15 so as to be driven by the respective shafts of the differential is a power transmitting shaft 20 that is operatively connected at its ends by suitable universal joints to said brake drum and wheel 6 respectively. From the above it is apparent that when the differential gearing 13 is being driven, driving power is transmitted to the wheels 6 by the shafts 20 before mentioned.

The radiator of the automobile is of course located in the conventional position at the front end of the automobile. In this instance the radiator which as shown is of the V type includes a shell indicated as a whole by the numeral 21. Said shell includes side walls 22—22, a top wall 22ª and a bottom front apron 23 extending into a plane below that of the side walls. A central rib 24 connects the top wall of the shell with the apron 23 and this rib divides the front of the shell into two open spaces in which are disposed the usual louvers 25.

On each side wall of the shell is provided a boss 26 having a horizontally disposed foot 27 which engages in supporting relation upon the rear end portion of the associated flange of a brake drum housing 14. A bolt 28 secures said foot to said flange.

The apron 23 is secured at each bottom corner to an inwardly extending lug 29 on the associated brake drum housing 14, a bolt 30 passing through each corner of said apron and through an associated lug 29 to secure the apron to said housings. The central portion 31 of said apron as defined by a beading 32 is made substantially as a part of a sphere to fit about that portion of the differential casing just to the rear of the same. By this construction the appearance of the apron is not only enhanced, but the apron is stiffened in a manner preventing vibration with attending noise. Centrally of the top wall of the radiator shell toward the rear thereof is provided the filler spout opening and cap 33 for the core 34 of the radiator best shown in Fig. 2.

35 indicate the head lamps of the automobile suitably supported upon brackets 36 connecting the side walls of the shell with the front fenders 37 and both brackets are secured together by a tie rod 38 extending transversely thru the shell between the louvers 25 and core 34 as best shown in Fig. 1.

With the parts arranged as described, many advantages are gained. Although the differential is disposed at the front of the automobile it is concealed by the apron part of the radiator shell and this apron part provides that height necessary to impart a neat, trim and pleasing appearance to the front end part of the automobile. The shell may be easily removed when necessary for inspection of the differential.

While in describing my invention I have referred in detail to the form, arrangement and construction of the various parts thereof the same is to be considered merely as illustrative so that I do not wish to be limited thereto except as may be specifically set forth in the appended claims.

I claim as my invention:—

1. A front drive automobile embodying therein a differential gear casing and a radiator shell arranged and supported in a position above the same and including a part covering and conforming to a part of said differential gear casing.

2. A front drive automobile embodying therein a differential gear casing and a radiator shell having an opening at the front, arranged and supported in a position above said casing and having a portion below said opening covering and conforming to a part of said differential gear casing.

3. A front drive automobile embodying therein a differential gear casing and a radiator shell having an opening at the front, arranged and supported in a position above said casing, said shell having an apron below said opening covering a part of said differential gear casing and having a bulged portion in line with said part of said casing.

4. A front drive automobile embodying therein a differential gear casing, means providing a support at each side of said casing and a radiator shell having an opening at the front arranged above said casing and engaged upon said support providing means and including a part covering and conforming to a part of said differential gear casing.

5. A front drive automobile embodying therein a differential gear casing, means providing a support at each side of said casing and a radiator shell having an opening at the front arranged above said casing and engaged upon said support providing means and including an apron below said opening covering and conforming to a part of said differential gear casing.

6. A front drive automobile embodying therein a differential gear casing, means providing a support at each side of said casing and a radiator shell arranged above said gear casing and engaged upon said support providing means, said shell having an apron below said opening covering a part of said gear casing, said apron having a bulged portion to conform with said part of said gear casing.

7. A front drive automobile embodying therein a differential gear casing, means providing a brake drum cover at each side of said differential and a radiator shell having an opening at the front arranged above said casing and supported upon said brake drum providing cover means, said shell having a part below said opening extending between said brake drum cover means and covering a part of said gear casing.

8. A front drive automobile embodying therein a differential gear casing, a brake drum cover at each side of said casing, and a radiator shell having an opening at the front disposed above said casing, said shell having side walls and an apron arranged below said opening, fixed to said brake drum covers, the apron covering a part of the differential casing.

In testimony whereof, I have hereunto set my hand, this 13th day of January, 1930.

ALAN H. LEAMY.